(12) United States Patent
Bank (10) Patent No.: US 10,305,289 B1
(45) Date of Patent: May 28, 2019

(54) PHASE CONVERTER FOR VECTOR CONVERSION OF THREE PHASE SIGNALS

(71) Applicant: Michael Bank, Jerusalem (IL)

(72) Inventor: Michael Bank, Jerusalem (IL)

( * ) Notice: Subject to any disclaimer, the term of this patent is extended or adjusted under 35 U.S.C. 154(b) by 0 days.

(21) Appl. No.: 15/732,500

(22) Filed: Nov. 20, 2017

(51) Int. Cl.
| | |
|---|---|
| *H02J 3/44* | (2006.01) |
| *H02J 3/02* | (2006.01) |
| *H02M 5/458* | (2006.01) |
| *H02M 5/27* | (2006.01) |
| *H02J 4/00* | (2006.01) |
| *H02M 1/00* | (2006.01) |

(52) U.S. Cl.
CPC ............... *H02J 3/44* (2013.01); *H02J 3/02* (2013.01); *H02J 4/00* (2013.01); *H02M 5/271* (2013.01); *H02M 5/458* (2013.01); *H02M 2001/0074* (2013.01)

(58) Field of Classification Search
CPC ....... H02J 3/02; H02J 3/44; H02J 4/00; G01R 25/00; H01F 30/12; H01F 30/14; H02M 7/44; H02M 2001/0074; H02M 2001/0077; H02M 5/14
See application file for complete search history.

(56) References Cited

U.S. PATENT DOCUMENTS

| | | | | |
|---|---|---|---|---|
| 5,130,628 | A * | 7/1992 | Owen ..................... | H02M 5/10 290/38 R |
| 6,560,132 | B1 * | 5/2003 | Roberts ................... | H02M 5/10 361/18 |
| 7,139,180 | B1 * | 11/2006 | Herbert ................... | H02M 1/42 363/124 |
| 9,246,405 | B2 * | 1/2016 | Bank ........................ | H02J 3/44 |
| 2003/0184940 | A1 * | 10/2003 | Staver .................... | H02H 1/066 361/93.6 |

* cited by examiner

*Primary Examiner* — Adolf D Berhane
(74) *Attorney, Agent, or Firm* — Henry M. Feiereisen LLC (57) ABSTRACT

A phase converter for electrical signals is configured for obtaining a vector sum of phase signals or subdividing one signal into several phase signals, including transformers and configured for successive addition of signals received from secondary windings of the transformers and inversion of one or several of the signals, or for subdivision of the one signal into the several phase signals.

3 Claims, 7 Drawing Sheets

PHASE CONVERTER FOR VECTOR CONVERSION OF THREE PHASE SIGNALS

BACKGROUND OF THE INVENTION

The present invention relates in general to phase converters in electrical systems for transmission of electrical energy.

A phase converter was first disclosed in U.S. Pat. No. US427,978 of Dolivo-Dobrowolsky, which deals with a method of obtaining a three-phase electric signal in an electrical system.

Many frequency-based methods for conversion of a single-phase electric signal into a three-phase electric signal via a permanent current with the use of converters are known. All of them however involve significant electrical power losses.

It is known to convert electrical signals by converters for their transmission through one wire or several wires, which are disclosed for example in Single-wire electrical energy transmission by Nikola Tesla (U.S. Pat. No. 1,119,736); The Goubau line, A single-wire transmission line at microwave frequencies. (Geog Goubau, "Surface waves and their Application to Transmission Lines," Journal of Applied Physics 21 (1950); AFEP experiment based on the Russian patent application by S. and K. Avramenko (PCT/GB93100960). In these converters, the phases of the signals do not actually change, but their frequency increases or their shape changes from AC to DC.

These methods which use known converters have substantial disadvantages in that they are expensive to build and install, the parameters of resulting signals depend on changes of a load, and the systems which use these methods are not reversible.

U.S. Pat. Nos. 9,608,441 and 9,246,405 disclose methods for conversion of one-phase or three-phase signals to provide a single-line systems. In these methods phases of input signals are made identical by means of phase shifters, and then there are added to each other. A disadvantage of these methods is dependence of phases of shifts from resistances of loads. The values of these resistances can vary in the process of use of the systems.

SUMMARY OF THE INVENTION

Accordingly, it is an object of the present invention to provide a phase convertor which when used in systems for transmission of electrical energy eliminates the above specified disadvantages.

In keeping with these objects and with others which will become apparent hereinafter, one feature of the present invention resides, briefly stated in a phase converter for electrical signals, which comprises means for obtaining a vector sum of phase signals, including transformer and configured for successive addition of signals received from secondary windings of the transformers and inversion of one or several of the signals.

According to a further feature of the present invention, the secondary windings of the transformers are connected in series, primary winding of the transformers receive signals of all phases, one of the signals is preliminarily inverted by a transformer with winding which are connected oppositely with one another, one of ends of a connection of the secondary winding forms an outlet of the converter and its second end is connected to a nullifier.

According to a further feature of the present invention, the above-mentioned means include an additional transformer with a winding connected between the outlet of the converter and the nullifier, and both ends of the secondary winding form an outlet.

According to a further feature of the present invention, a single signal which is vector V is supplied to an input of the converter, the single signal is divided into three signals A, B, C, the signal A is obtained by turning a phase of the sector V by 60° by a capacitor or and inductance winding whose reactive resistance is greater than a reactive resistance of a load of the converter, the vector B is obtained by inverting a copy of the vector V, the vector C is obtained by a vector addition of copies of the vectors A and B.

According to a further feature of the present invention, a transformer is connected at the input of the converter and its winding is connected to an output of a single phase line, while its secondary winding is connected between an input of the inverter and a nullifier.

When the converter is designed according to the present invention, it eliminates the disadvantages of the prior art and provides highly advantageous results.

The novel features of the present invention are set forth in particular in the appended claims.

The invention itself both as to its construction and its method of operation will be best understood from the following description of preferred embodiments which is accompanied by the following drawings.

DESCRIPTION OF THE PREFERRED EMBODIMENTS

The converter according to the present invention is designed to operate on the basis of a vector synthesis.

It is known that in a three-phase electrical energy transmission system the electrical energy is transmitted through three lines or wires, and phases of electrical signals are offset from each other by 120°. For obtaining a single-phase signal the three-phase signal is separated into three signals and they are used for different loads.

It is however sometimes necessary to convert the whole three-phase signal into one single-phase signal (two-wire signal). For example, it takes place when it is required to supply the whole power supplied from the three-phase system to one single-phase load. This is not possible to achieve by simple summation of the three signals because a sum of the three signals which are offset from each other by 120° is equal to zero.

The converter according to the present invention is configured so that it makes possible a conversion of a three-phase signal into a single phase (two-wire) signal, or into a single-wire signal, and vice versa.

Figure 1:
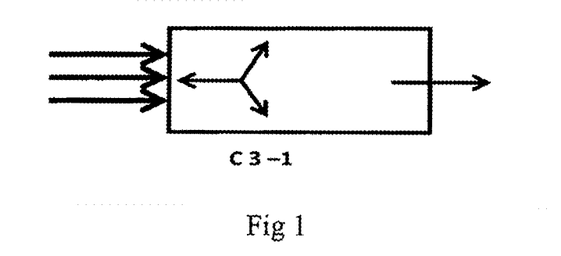
FIG. 1 is a view symbolically showing a converter according to the invention for converting a three-phase signal into a single-phase signal.

The convertor according to the present invention for converting a three-phase signal into a single wire signal is symbolically shown in FIG. 1.

Figure 2:
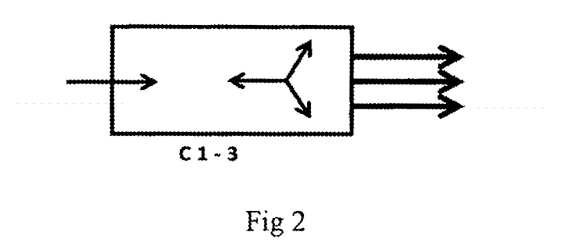
FIG. 2 is a view symbolically showing a converter according to the invention for converting a single-wire signal into a three-phase signal.

The convertor according to the present invention for converting a single-wire signal into a three-phase is symbolically shown in FIG. 2.

Figure 3:
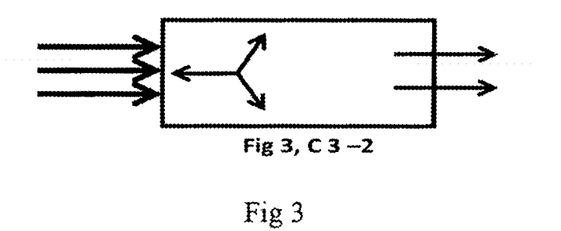
FIG. 3 is a view symbolically showing a converter according to the invention for converting a three-phase signal into a single-phase signal.

The convertor according to the present invention for converting a three-phase signal into a single-phase signal is symbolically shown in FIG. 3.

Figure 4:
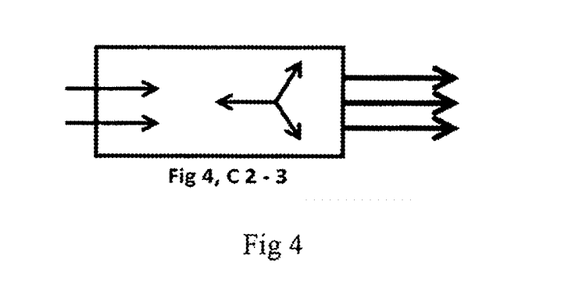
FIG. 4 is a view symbolically showing a converter according to the invention for converting a single-phase signal into a three-phase signal.

The convertor according to the present invention for converting a single-phase signal into a three-phase signal is symbolically shown in FIG. 4.

Figure 5:
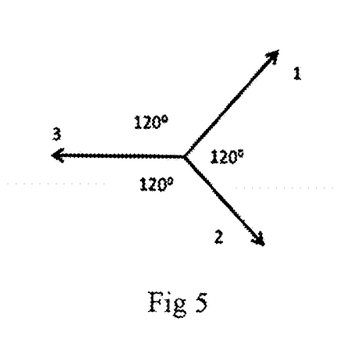
FIG. 5 is a view showing vectors of a three-phase signal according to the present invention.

The convertor according to the present invention for converting a three-phase signal into a single wire signal is symbolically shown in FIG. 1 is designed for example as follows. It is known that the phases of signals or currents in a three-phase system are offset from each other by 120° as shown in FIG. 5.

Figure 6:
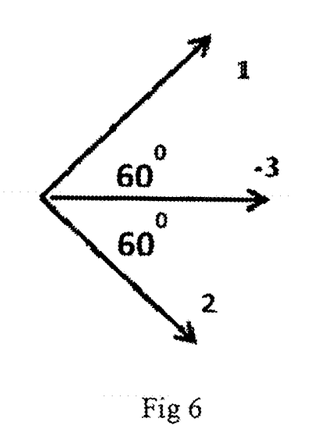
FIG. 6 is a view showing inverting of a vector 3 by the convertor according to the present invention.

For obtaining from the three-phase signal of one single-line or single-wire signal the direction of a vector of one of the currents is changed to an opposite direction, for example of vector 3. As a result the angles of all vectors are obtained as shown in FIG. 6. Then all three vectors are summated.

It is shown below that when the converter according to the present invention is used the above described method which is carried out by it will not lead to any losses.

For a three-phases system the following is known:
1. A sum of three signals in a three-phase system equal to zero,
2. It is known that the power of a balanced three-phase system is equal to the sum of the powers of three phases.

Let us summate two vectors of voltages (1 and 2) with phases offset by 120°:

$$V\Sigma^2 = V1^2 + V2^2 + 2V1*V2 \, Cos(\Delta\varphi)$$

Cos 120°=−0.5 Cos 60°=0.5

For $V1=V2=V$ and $\Delta\varphi=120°$ $$V\Sigma^2 = V^2 + V^2 - V*V = V^2$$

It can be seen that the value of the summated vector is equal to the value of each of the vectors V. There were two signals with phases + and −60° and voltages of the source V. They were united, and this means that a signal is obtained with a phase equal 0 and voltage V.

Figure 7:
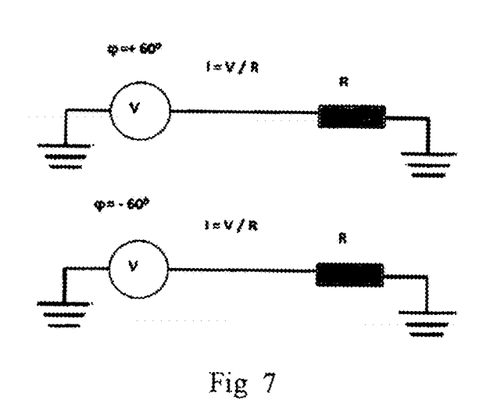
FIG. 7 is a view showing currents produced by two vectors 1 and 2 separately by the convertor according to the present invention.
Figure 8:
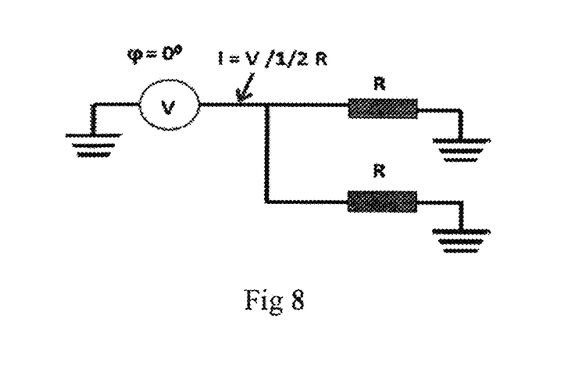
FIG. 8 is a view showing currents produced by two vectors 1 and 2 together by the convertor according to the present invention.

FIG. 7 shows the currents which are produced by two vectors 1 and 2 separately, while FIG. 8 shows the summated power after uniting of the two vectors. In other words the summated voltage after uniting of the two vectors 1 and 2 is equal 2 V. The value of the sum of two vectors of voltages is equal to V. This means that the sums of three vectors in FIG. 5 will be equal to 0. The power of the three phases will be equal to 3VI, since the current in the common wire will be equal to the triple phase current. This means that both conditions of a three-phase system are satisfied.

Figure 9:
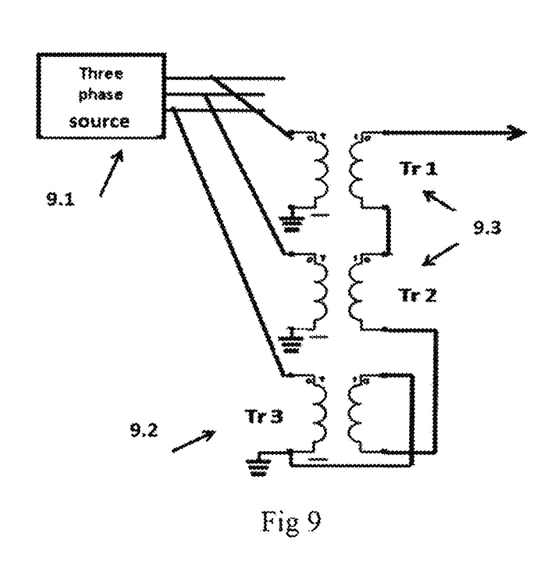
FIG. 9 is a view showing an electrical scheme of a converter C3-1 according to the present invention.

FIG. 9 shows a converter C1-3 according to the present invention, which realizes summation of all three vectors. Three phase source 9.1 gives the energy to two transformers (9.2) and transformer 9.3. A transformer 9.3 is introduced, with the use of an opposite connection of the windings, which actually corresponds to the nullifiers of the inventor. The secondary windings of all three transformers are connected in series for addition of all three vectors.

As can be seen from FIG. 9, here there are no phase shifters of the types LR or CR. There are only transformers which do not change the power of the signals.

This means that the operation of the converter 3-1 does not depend on changes of load values.

Figure 10:
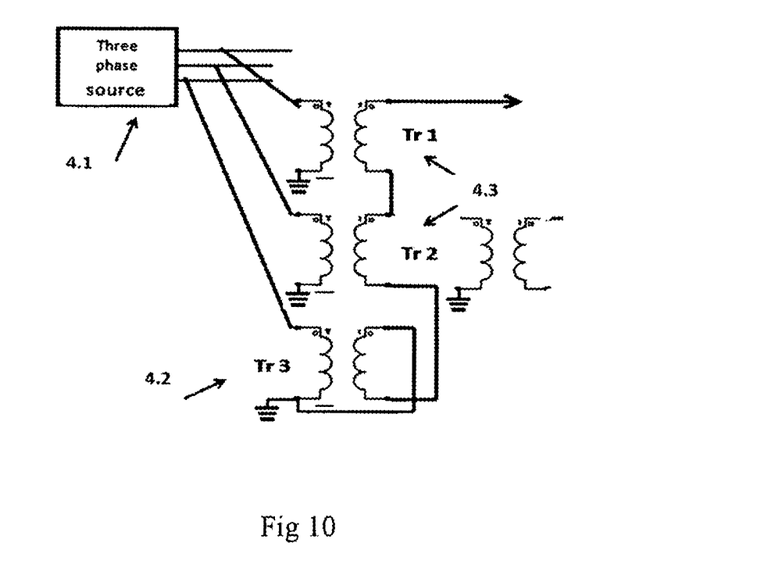
FIG. 10 is a view showing an electrical scheme of a converter C3-2 according to the present invention.

The converter C3-2 in FIG. 10 can be made by connecting to the converter 3-1 of an additional transformer.

Figure 11:
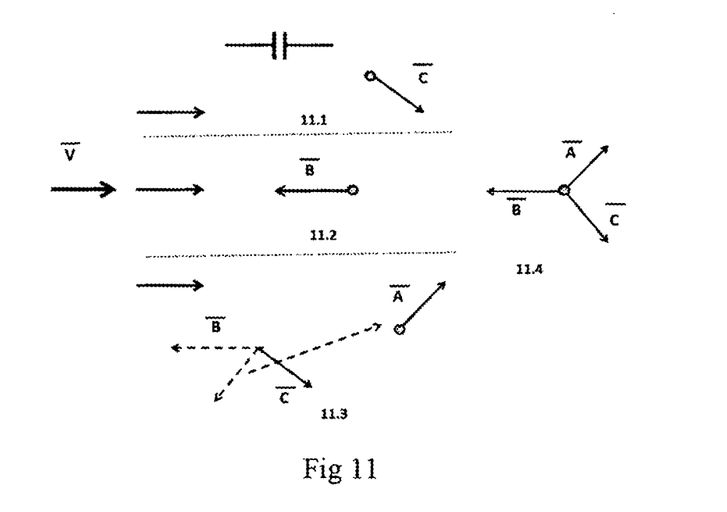
FIG. 11 is a view showing a vector synthesis of a converter C3-1 with the use of a capacitor according to the present invention.

The converter C1-3, which uses capacitor, shown uses the concept of vector synthesis according to the present invention for conversion of a single-line or single-wire signal into a three-phase signal in a manner particularly illustrated in this FIG. 11 of the drawing.

Vector V is supplied to the input of the converter C1-3, and it converts vector V into vectors A, B, C having phases shifts between them of 120°. For this vector A (11.3) is obtained by turning of a phase of a copy of vector V by 60° by means of a capacitor, who reactive resistance is greater than active resistance of a load of the converter. Vector B (11.2) is obtained as a result of inversion of the vector V. Vector C (11.1) is obtained by a vector addition of copies of the vectors A and B (11.3).

Figure 12:
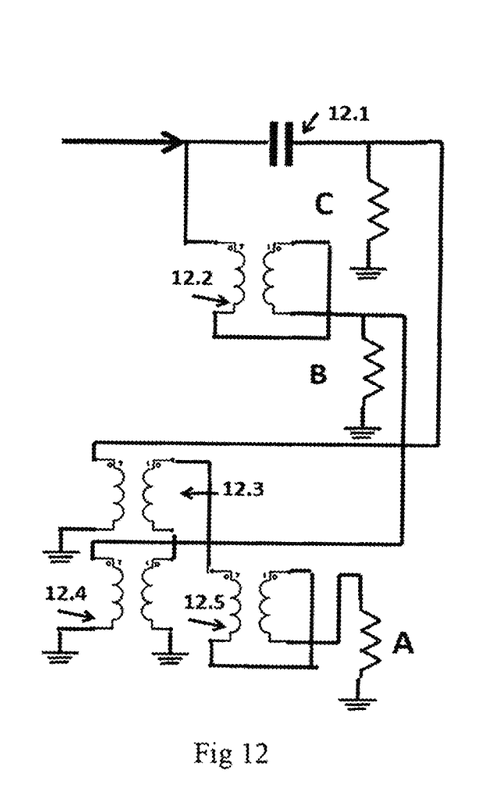
FIG. 12 is a view showing an electrical scheme of a converter C1-3 with the use of a capacitor according to the present invention.

FIG. 12 shows an electrical scheme of the converter C1-3 with the use of a capacitor 12.1. It includes transformers 12.2, 12.3, 12.4 and 12.5. The transformer 12.3 is introduced into the system with the opposite windings 12.4, 12.5 and 12.6 of the loads of the three-phase system A, B and C. The current in the transformer 12.5 is a vector sum of currents of the load C and B after the inversion and the input current after inversion. The current in the load B is an inverted current of the input signal. Element 12.1 is a capacitor whose reactive resistance is greater than the active resistance of the load C.

Figure 13:
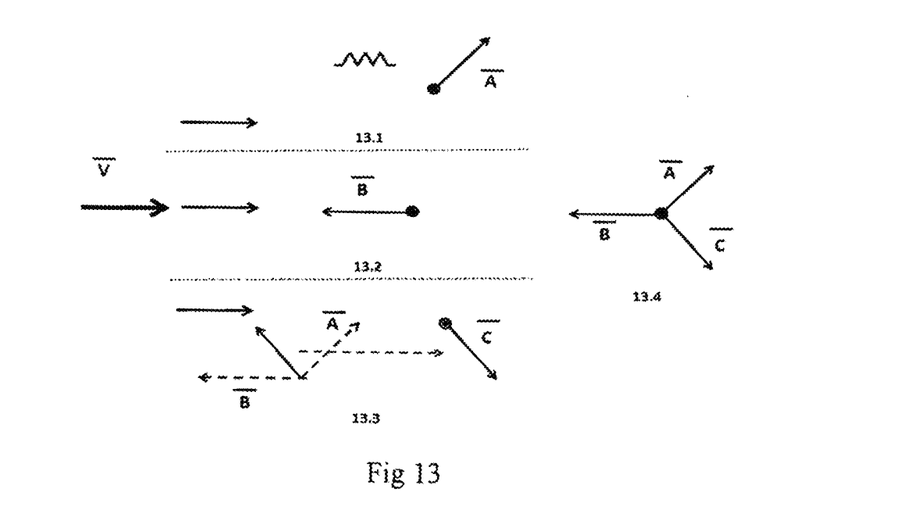
FIG. 13 is a view showing a vector synthesis of a converter C3-1 with the use of a inductance according to the present invention.

The converter C1-3, which uses inductance, shown uses the concept of vector synthesis according to the present invention for conversion of a single-line or single-wire signal into a three-shapes signal in a manner particularly illustrated in this FIG. 13 of the drawing. Vector V is supplied to the input of the converter C1-3, and it converts vector V into vectors A, B, C having phases shifts between them of 120°. For this vector A (13.1) is obtained by turning of a phase of a copy of vector V by 60° by means of an inductance, who reactive resistance is greater than active resistance of a load of the converter. Vector B (13.2) is obtained as a result of inversion of the vector V. Vector C (13.3) is obtained by a vector addition of copies of the vectors A and B.

Figure 14:
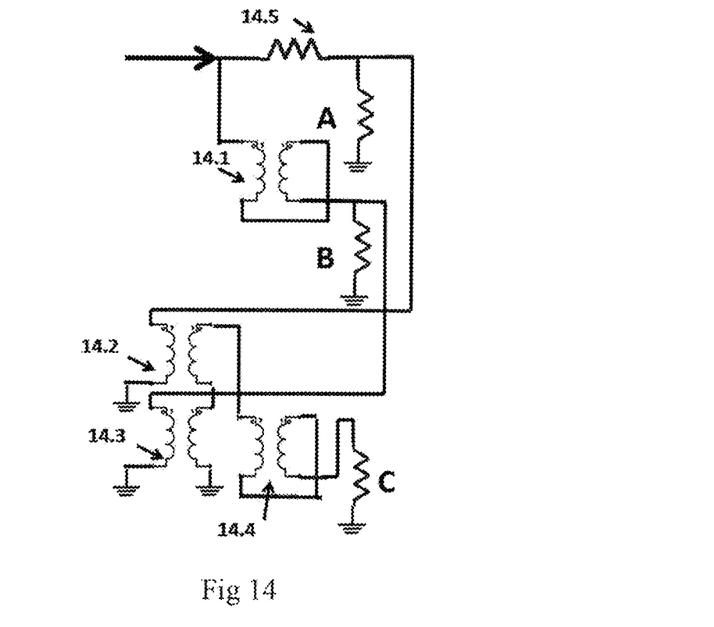
FIG. 14 is a view showing an electrical scheme of a converter C1-3 with the use of an inductance according to the present invention.

FIG. 14 shows an electrical scheme of the converter C1-3 with the use of a inductor 14.5. It includes transformers 14.1, 14.2, 13.3 and 14.4. The transformer 14.1 is introduced into the system with the opposite windings. The current in the transformer 12.4 is a vector sum of currents of the load A and B after the inversion. The current in the load B is an inverted current of the input signal. Element 14.51 is an inductor whose reactive resistance is greater than the active resistance of the load The converter C 3-1 can be realized as is shown by stimulation according to a program ADC in FIG. 15. It includes the same elements as in FIG. 10 but in a form required for stimulation.

Figure 15:
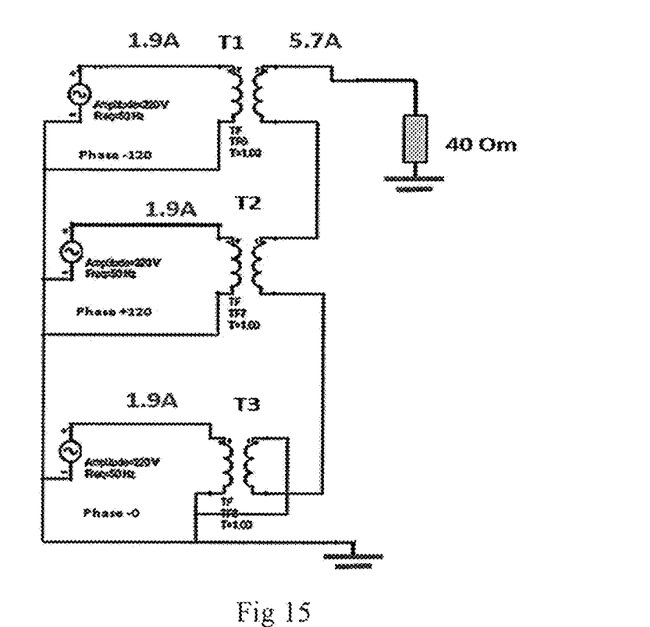
FIG. 15 is a view showing a simulation of the operation of the converter C3-1 and results of simulation according to the present invention.

Simulation results on FIG. 15 show that the sum of the powers of the three phases at the converter input is equal to the signal power on the load. That is, in the case of ideal transformers, this converter operates without loss.

Figure 16:
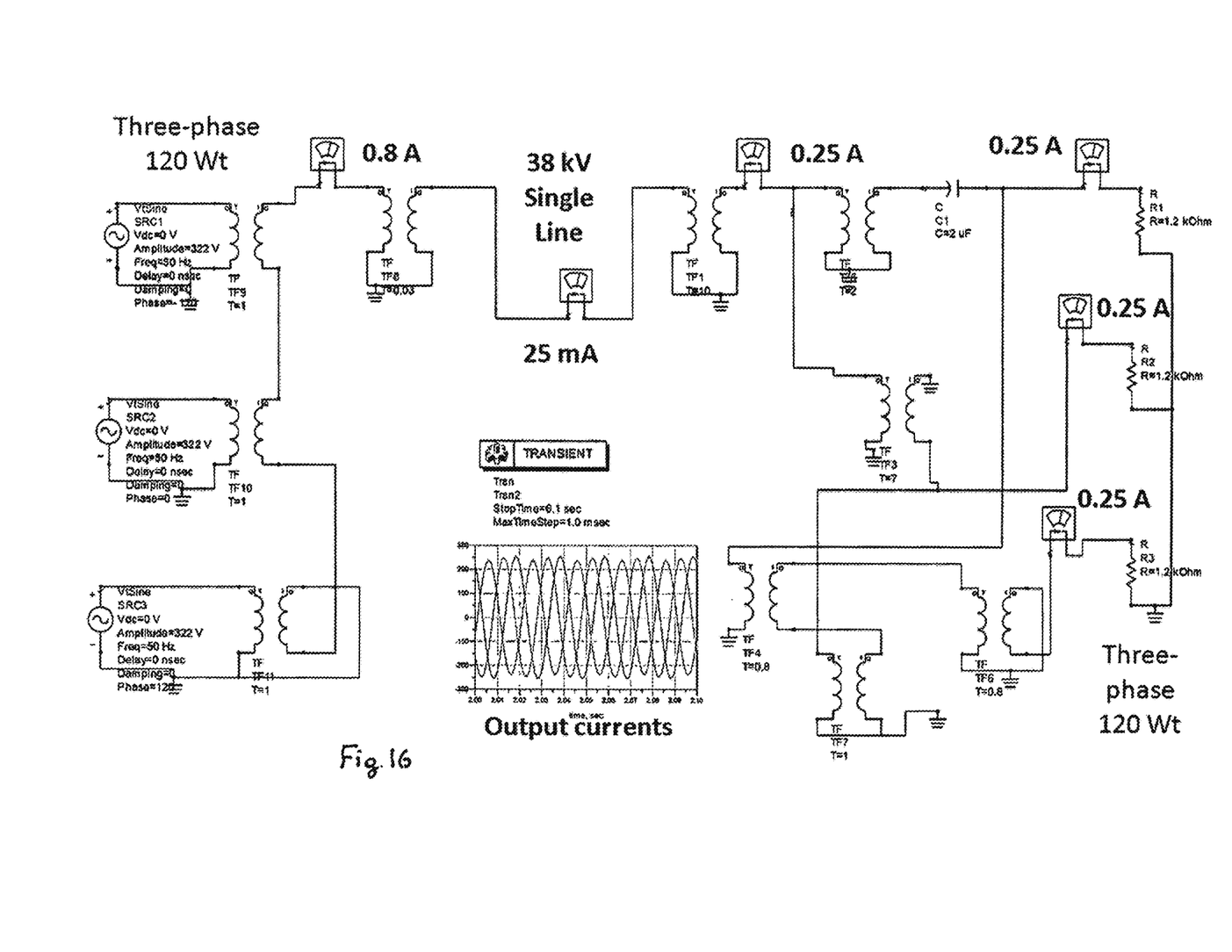
FIG. 16 is a view showing a simulation of the operation of the converters C3-1 with C 1-3 including step-up and step-down transformers and results of simulation according to the present invention.

FIG. 16 shows a scheme and results of simulation of connection of two converters C 3-1 and C 1-3. Increasing and reducing transformers are introduced between them in the single-wire line.

The values of currents and input data show that the powers supplied from the three-phase source are equal to the powers on the loads.

As a zeroing unit or a ground it is recommended to use a nullifier. If the resistance of the nullifier is close to zero, then the currents entering it will not cause energy losses. The resistance of the nullifier can be of any low value if several nullifiers connected in parallel are utilized. In this case a current from the nullifier does not propagate into ground.

The construction and the operation of the nullifier is disclosed in M. Bank, "It is Quite Another Electricity", Second Edition, Revised, Partridge, Publishing 2017, The present invention is not limited to the details shown since various modifications and structural changes are possible without departing from the spirit of the invention. What is desired to be protected by Letters Patent is set forth in the appended claims.

The invention claimed is:

1. A phase converter for electrical signals, comprising means for obtaining a vector sum of phase signals or subdividing one signal into several phase signals, said means including transformers configured for successive addition of signals received from secondary windings of the transformers and inversion of one or several of the signals, or for subdivision of the one signal into the several phase signals, where in one or in several of the transformers a secondary winding is switched opposite to its prime winding forming an inverted signal, and in said one or several transformers in which the secondary winding is switched opposite to the prime winding forming the inverted signal the secondary winding and the primary winding have a common point connected to a nullifier or a grounding, while secondary windings of some of the transformers are connected in series.

2. A phase converter for electrical signals of claim 1, wherein said means include an additional transformer with a primary winding connected between an outlet of the converter and the nullifier or the grounding and a secondary winding with both ends representing the outlet of the converter.

3. A phase converter for electrical signals, comprising means for obtaining a vector sum of phase signals or subdividing one signal into several phase signals, said means including transformers configured for successive addition of signals received from secondary windings of the transformers and inversion of one or several of the signals, or for subdivision of the one signal into the several phase signals, where in one or in several of the transformers a secondary winding is switched opposite to its first winding forming an inverted signal, while secondary windings of some of the transformers are connected in series, further comprising an input, wherein a single signal which is vector V is supplied to the input of the converter, the single signal is divided into three signals including first, second and third, the first vector is obtained by turning a phase of the sector V by 60° by a capacitor or and inductance winding whose reactive resistance is greater than a reactive resistance of a load of the converter, the second vector is obtained by inverting a copy of the vector V, the third vector is obtained by a vector addition of copies of the first and second vectors.

* * * * *